(12) United States Patent
Kuo et al.

(10) Patent No.: US 8,893,573 B2
(45) Date of Patent: Nov. 25, 2014

(54) BALL SCREW DEVICE HAVING BALL RETURN PIPE

(75) Inventors: Chang Hsin Kuo, Taichung (TW); Tsung Shien Chiang, Taichung (TW)

(73) Assignee: Hiwin Technologies Corp., Situn, Taichung (TW)

( * ) Notice: Subject to any disclaimer, the term of this patent is extended or adjusted under 35 U.S.C. 154(b) by 384 days.

(21) Appl. No.: 13/374,554

(22) Filed: Jan. 3, 2012

(65) Prior Publication Data

US 2012/0103121 A1  May 3, 2012

Related U.S. Application Data

(63) Continuation-in-part of application No. 12/315,098, filed on Nov. 25, 2008, now abandoned.

(51) Int. Cl.
*F16H 1/24* (2006.01)
*F16H 25/22* (2006.01)

(52) U.S. Cl.
CPC .................................. *F16H 25/2214* (2013.01)

USPC .......................................................... 74/424.86

(58) Field of Classification Search
USPC ............................................ 74/424.81–424.88
See application file for complete search history.

(56) References Cited

U.S. PATENT DOCUMENTS

| 6,023,991 | A  | 2/2000  | Yabe et al. |
| 6,089,117 | A  | 7/2000  | Ebina et al. |
| 6,481,305 | B2 | 11/2002 | Nishimura et al. |

*Primary Examiner* — Alan B Waits
(74) *Attorney, Agent, or Firm* — Charles E. Baxley

(57) ABSTRACT

A ball screw device includes a screw engaged into a nut member for forming an endless ball guiding passage between the nut member and the screw and for receiving a number of ball bearing members, a ball return pipe includes a U-shaped structure having a central tubular member and two ends for engaging into two orifices of the nut member, and the nut member includes a straight fence formed between the orifice and the screw hole of the nut member for guiding the ball bearing members to move through a ball return pathway of the ball return pipe and the endless ball guiding passage of the nut member and for preventing the teeth of the nut member from being broken by the ball bearing members.

6 Claims, 8 Drawing Sheets

BALL SCREW DEVICE HAVING BALL RETURN PIPE

The present invention is a continuation-in-part of U.S. patent application Ser. No. 12/315,098, filed 25 Nov. 2008, and to be abandoned.

BACKGROUND OF THE INVENTION

1. Field of the Invention

The present invention relates to a ball screw device, and more particularly to a ball screw device including a securing or mounting structure for suitably and smoothly attaching or anchoring or securing or retaining a ball return pipe to the ball screw device and for suitably guiding the ball bearing members to smoothly move through the endless ball guiding passages of the ball screw device and the ball return pipe.

2. Description of the Prior Art

Typical ball screw devices comprise a nut threaded onto an elongated bolt or screw and rotatable and movable or adjustable along the screw, one or more endless ball guiding passages formed in the ball screw device for slidably receiving ball bearing members, and one or more ball return pipes attached onto the ball screw device for guiding the ball bearing members to smoothly and suitably move through the endless ball guiding passages of the ball screw device.

For example, U.S. Pat. No. 6,023,991 to Yabe et al. discloses one of the typical ball screw return systems comprising a ball return pipe engaged onto the ball screw nut with a tube holder member and fasteners for guiding the ball bearing members to smoothly move through the endless ball guiding passage of the ball screw device, and the ball return pipe include two tubular tongues formed in the ends for engaging into the nut.

However, the ball return pipe may not be precisely secured to the nut, and the tubular tongues of the ball return pipe may not be precisely directed toward the endless ball guiding passage of the ball screw device, or the ball return pipe may not be precisely meshed with the nut such that one or more projections or protrusions may be extended into the endless ball guiding passage of the ball screw device and may interfere the movement of the ball bearing members through the endless ball guiding passage of the ball screw device.

U.S. Pat. No. 6,089,117 to Ebina et al. discloses another typical ball screw and nut assembly comprising a ball return pipe engaged or attached or secured onto a nut with a standard hose clamp for guiding the ball bearing members to smoothly move through the endless ball guiding passage of the ball screw and nut assembly.

However, similarly, the ball return pipe may not be precisely secured to the nut, and the tubular tongues of the ball return pipe may not be precisely directed toward the endless ball guiding passage of the ball screw device, or the ball return pipe may not be precisely meshed with the nut such that one or more projections or protrusions may be extended into the endless ball guiding passage of the ball screw device and may interfere the movement of the ball bearing members through the endless ball guiding passage of the ball screw device.

U.S. Pat. No. 6,481,305 to Nishimura et al. discloses a further typical ball screw device also comprising one or more ball return pipes attached onto the ball screw nut and each having two bent tubular ends engaged into the ball screw nut for guiding the ball bearing members to smoothly move through the endless ball guiding passage of the ball screw device.

However, the ball return pipe may not be precisely secured to the nut, and the tubular tongues of the ball return pipe may not be precisely directed toward the endless ball guiding passage of the ball screw device, or the ball return pipe may not be precisely meshed with the nut such that one or more projections or protrusions may be extended into the endless ball guiding passage of the ball screw device and may interfere the movement of the ball bearing members through the endless ball guiding passage of the ball screw device, and may be broken by the ball bearing members when the ball bearing members are moved in a fast speed through the endless ball guiding passage of the ball screw device.

The present invention has arisen to mitigate and/or obviate the afore-described disadvantages of the conventional ball return pipes for the ball screw devices.

SUMMARY OF THE INVENTION

The primary objective of the present invention is to provide a ball screw device including a securing or mounting structure for suitably and smoothly attaching or anchoring or securing or retaining a ball return pipe to the ball screw device and for suitably guiding the ball bearing members to smoothly move through the endless ball guiding passages of the ball screw device and the ball return pipe.

In accordance with one aspect of the invention, there is provided a ball screw device comprising an elongated screw including a helical groove formed therein, a nut member including a screw hole formed therein for receiving the screw, and including a helical groove for engaging with the helical groove of the screw, and for forming an endless ball guiding passage between the nut member and the screw, and including two orifices formed in the nut member and communicating with the helical groove of the nut member, the nut member including two apertures formed therein and aligned with the orifices and concentric with the orifices and communicating with the orifices of the nut member respectively, and the orifices including an inner diameter greater than that of the apertures of the nut member for forming a peripheral shoulder between the orifice and the aperture of the nut member, a plurality of ball bearing members engaged in the endless ball guiding passage of the ball screw device, a ball coupler device including a connecting member, and a plurality of spacers secured to the connecting member for forming a plurality of compartments between the spacers and for receiving the ball bearing members and for coupling the ball bearing members together, a ball return pipe including a U-shaped structure having a central tubular member, and having two ends for engaging into the orifices of the nut member respectively and for engaging with the peripheral shoulder that is formed between the orifice and the aperture of the nut member, and having two curved coupling portions formed between the central tubular member and the ends, and the ball return pipe including a ball return pathway formed therein and communicating with the helical groove and the endless ball guiding passage of the nut member for receiving the ball bearing members, and the nut member including a straight fence formed between the orifice and the screw hole of the nut member and formed in the aperture of the nut member for guiding the ball bearing members to move through the ball return pathway of the ball return pipe and the endless ball guiding passage of the nut member and for preventing the connecting member of the ball coupler device from being contacted and interfered with the nut member. The straight fence of the nut member includes a length (L) ranged between 0.5 and 30 mm.

The ball return pipe includes an inner diameter no less than that of the aperture of the nut member. The ball return pipe includes an inner peripheral wall for forming the ball return pathway of the ball return pipe and flushing with the straight fence of the nut member.

The nut member further includes a cut off portion formed in an upper portion thereof and defined by an upper surface of the nut member.

The nut member includes an inner diameter greater than an outer diameter of the screw for forming a peripheral slot between the screw and the nut member and for receiving and anchoring and retaining the connecting member of the ball coupler device between the screw and the nut member.

The straight fence of the nut member includes a width (W) equals to a distance (d) that the connecting member is extended relative to the screw hole of the nut member for suitably guiding the connecting member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
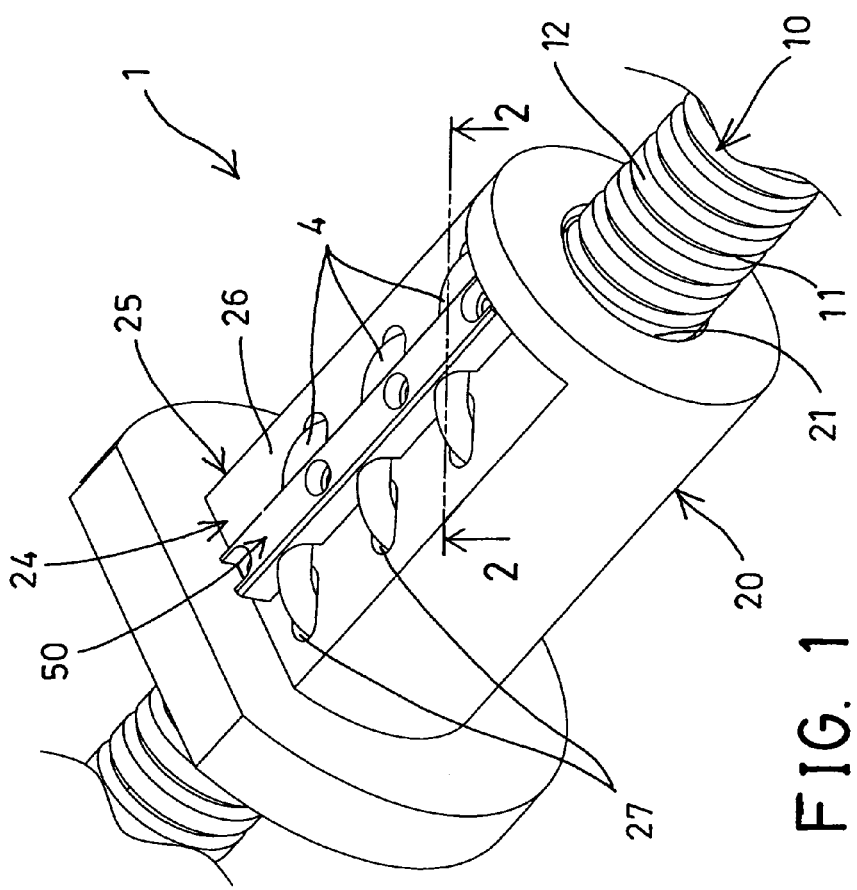
FIG. 1 is a partial perspective view of a ball screw device including two ball return pipes in accordance with the present invention.

Referring to the drawings, and initially to FIGS. 1-4, a ball screw device 1 in accordance with the present invention comprises an elongated bolt or screw 10 including one or more helical threaded portions or grooves 11 formed therein and/or including one or more helical teeth 12 formed between the helical threaded portions or grooves 11 of the screw 10, and comprises a nut member 20 including a screw hole 21 formed therein for threading or engaging with the screw 10, and for allowing the nut member 20 to be rotated and moved or adjusted along the screw 10. The nut member 20 also includes one or more helical threaded portions or grooves 22 formed therein and/or including one or more helical teeth 23 formed between the helical threaded portions or grooves 22 of the nut member 20.

The helical threaded portions or grooves 22 and/or the helical teeth 23 of the nut member 20 may be threaded or engaged with the corresponding helical teeth 12 and/or the helical threaded portions or grooves 11 of the screw 10 for allowing the nut member 20 to be rotated and moved or adjusted along the screw 10, and for forming one or more endless ball guiding passages 8 in the ball screw device 1 or between the nut member 20 and the screw 10 and for receiving a number of ball bearing members 80 which may thus be slidably engaged between the nut member 20 and the screw 10 for bearing the nut member 20 on the screw 10 and for allowing the nut member 20 to be smoothly rotated and moved or adjusted along the screw 10.

Figure 2:
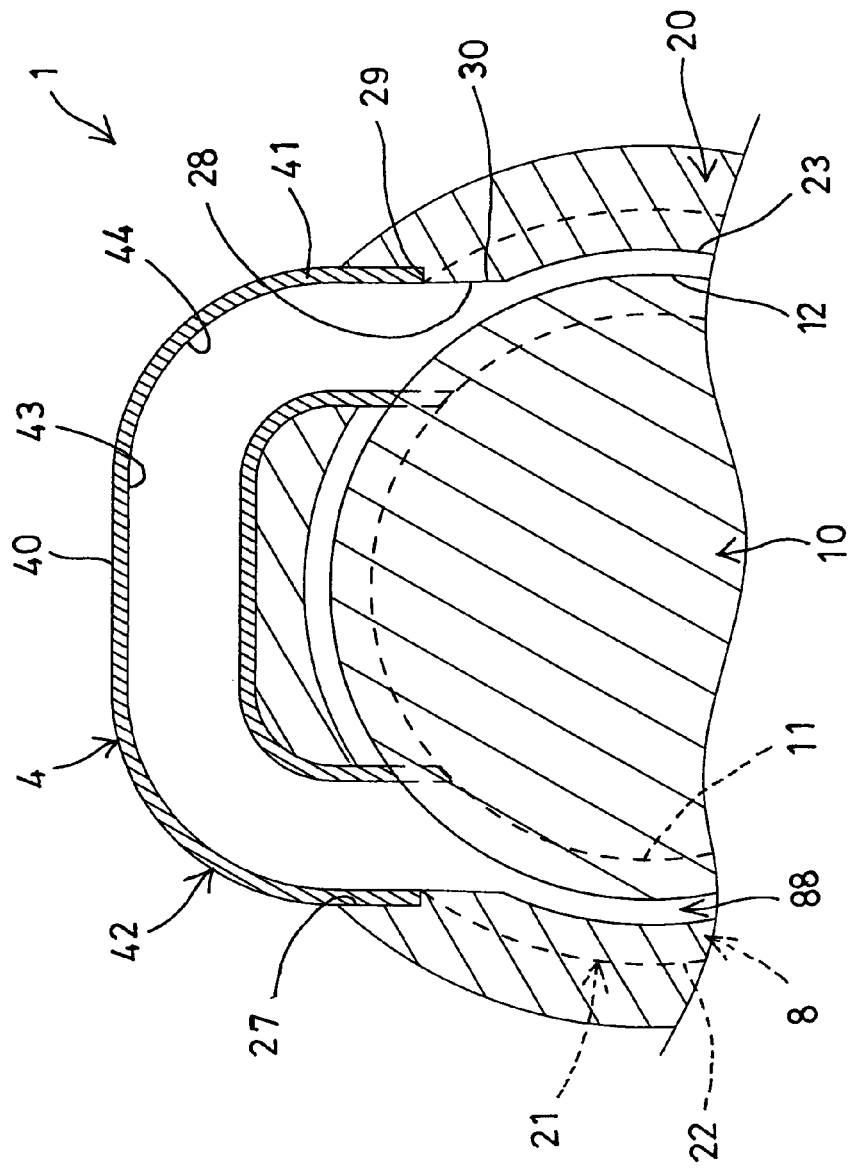
FIG. 2 is a partial cross sectional view of the ball screw device; taken along lines 2-2 of FIG. 1.
Figure 3:
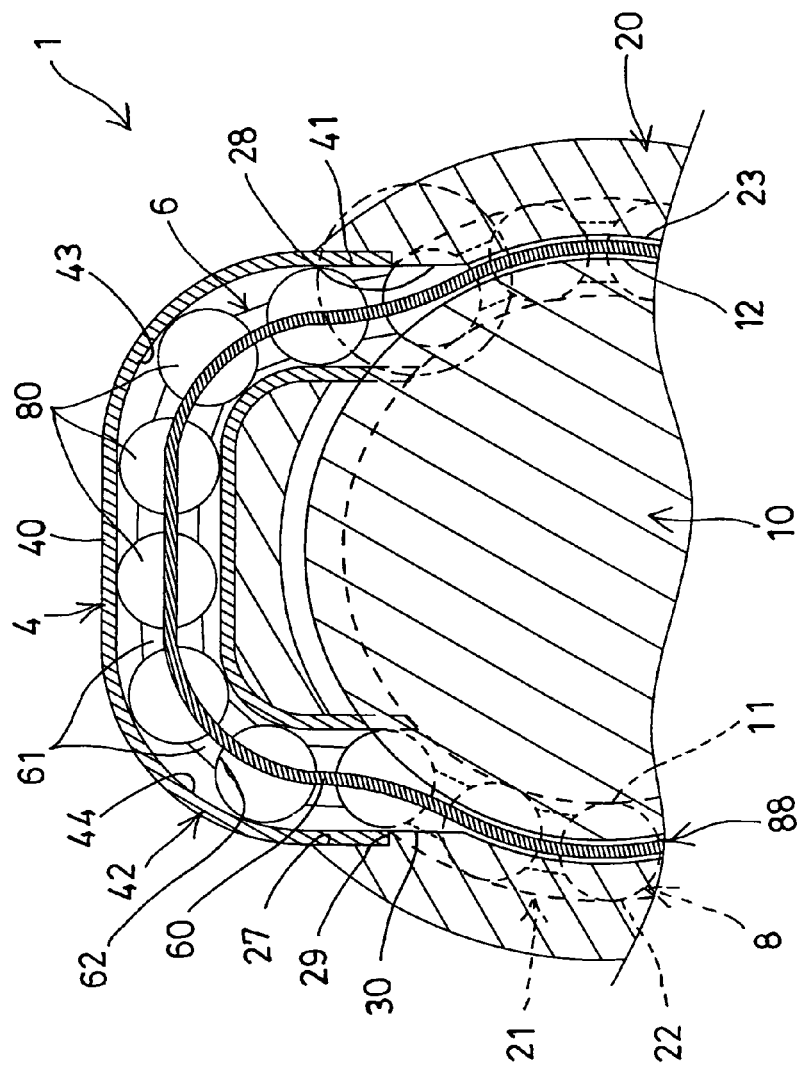
FIG. 3 is another partial cross sectional view similar to FIG. 2, illustrating the operation of the ball return pipe for the ball screw device.
Figure 4:
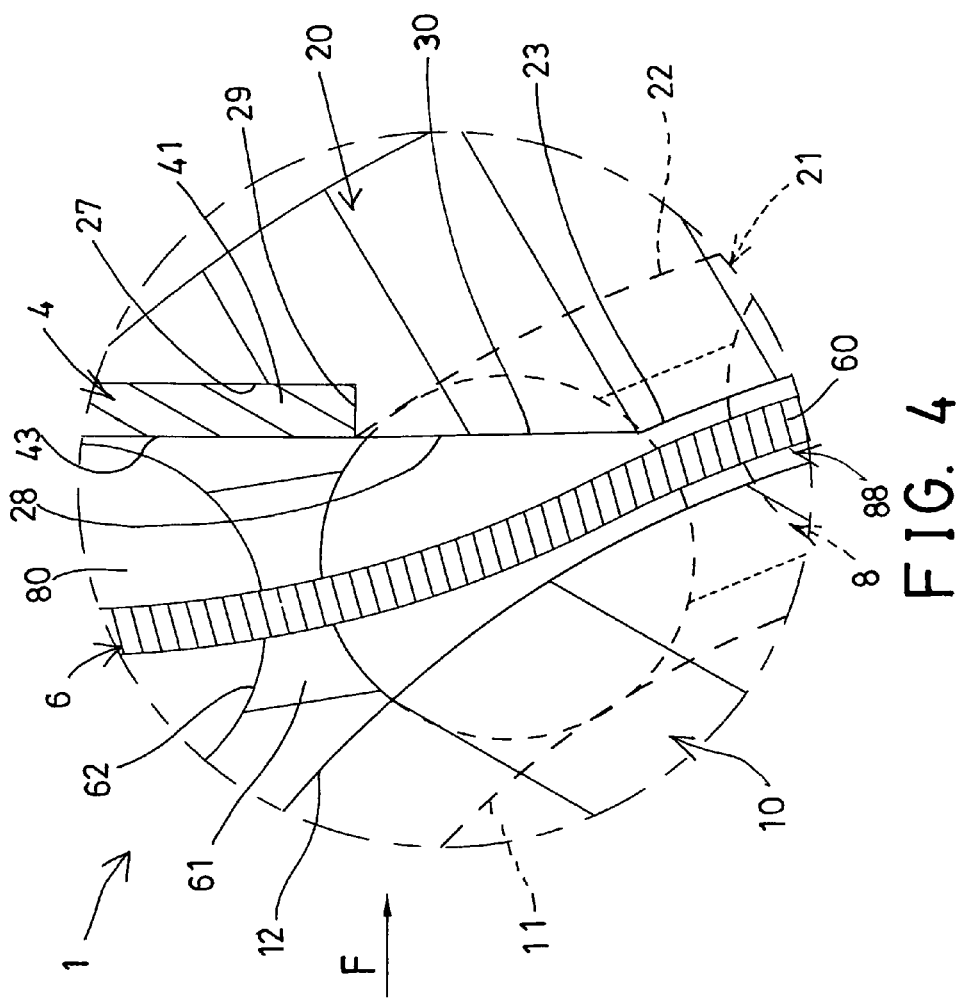
FIG. 4 is an enlarged partial cross sectional view of the ball return pipe and the ball screw device.

The ball bearing members 80 may be selected from spherical ball members or cylindrical roller members or the like, and the coupling or threading structure or the engagement between the nut member 20 and the screw 10 is typical and will not be described in further details. The nut member 20 includes a cut off portion 24 formed therein, such as formed in the upper portion 25 of the nut member 20, and formed or defined by an upper flat surface 26, and includes one or more (such as three) pairs of orifices 27 formed in the upper portion 25 of the nut member 20 (FIG. 1) and communicating with the cut off portion 24 and the helical grooves 22 and/or the endless ball guiding passages 8 of the nut member 20 (FIGS. 2-4).

Figure 5:
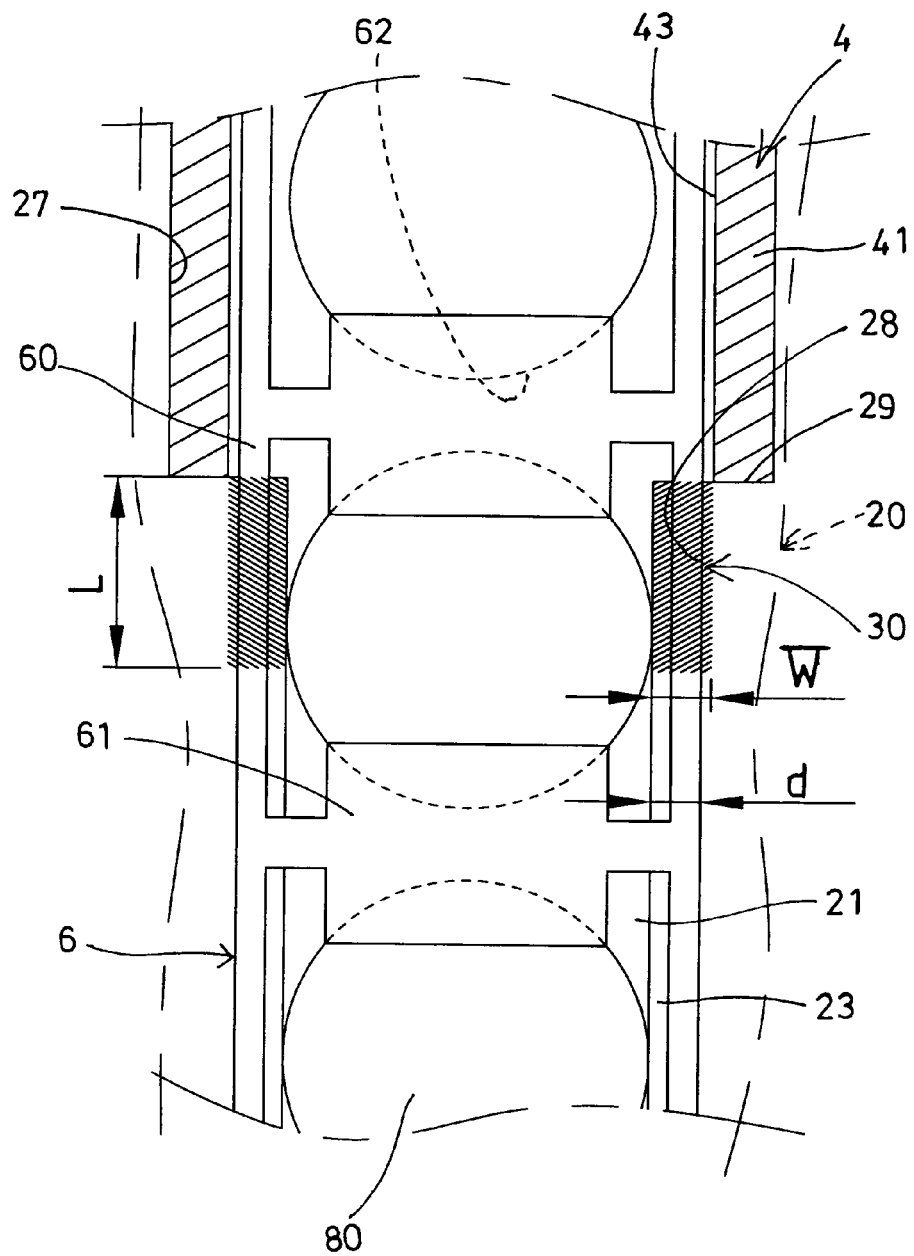
FIG. 5 is a partial side plan schematic view of the ball screw device as seen from a direction indicated by an arrow F of FIG. 4 for illustrating the detailed structure of the ball screw device and the ball return pipe.
Figure 6:
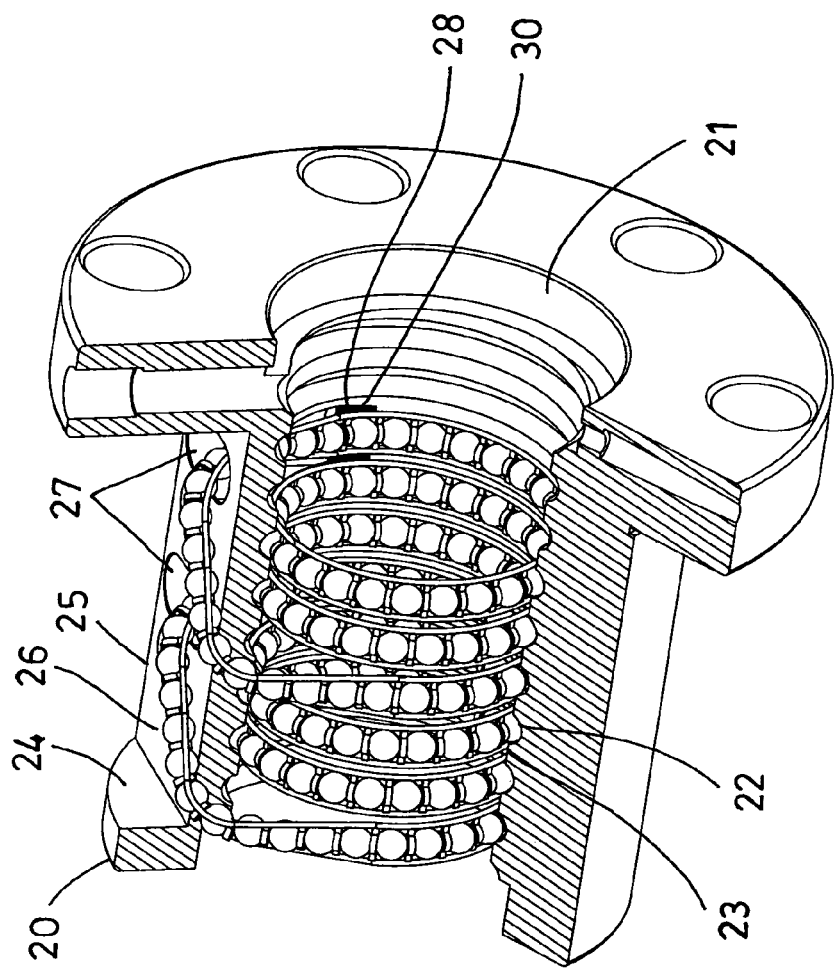
FIG. 6 is a perspective view of a nut member of the ball screw device, in which a portion, such as one quarter of the nut member has been cut off for showing or illustrating the inner structure of the nut member.
Figure 7:
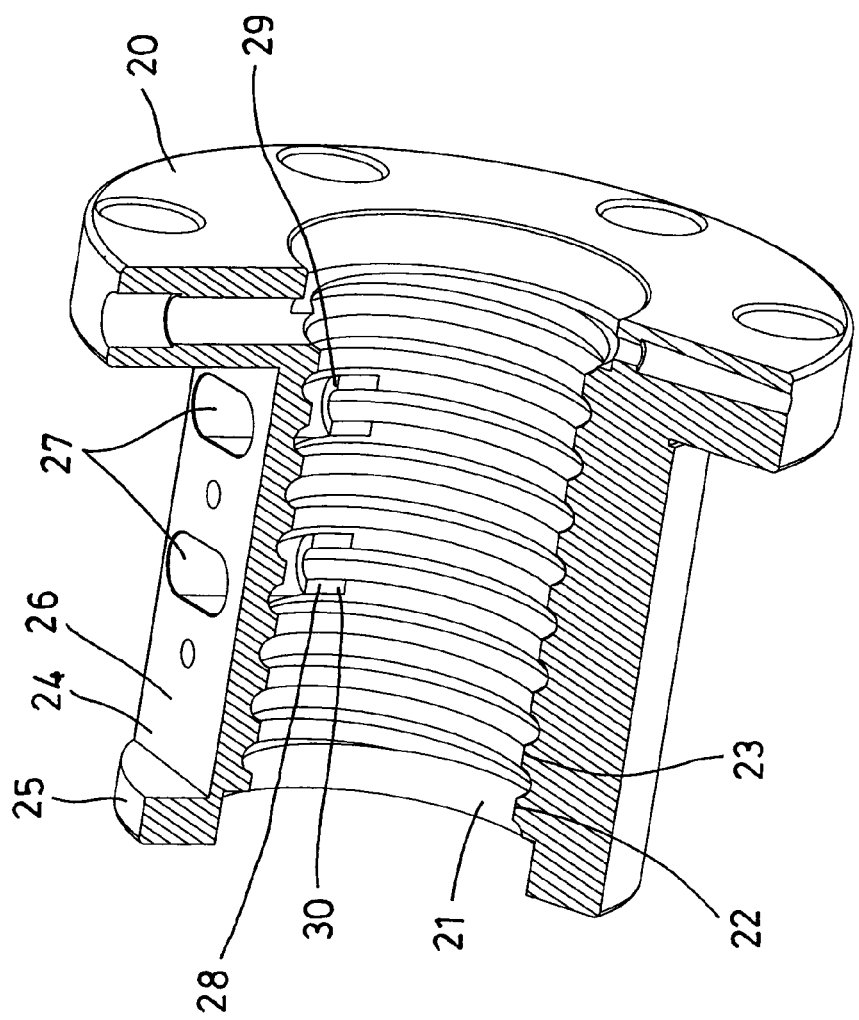
FIG. 7 is another perspective view similar to FIG. 6, in which the ball bearing members have been removed for showing the inner structure of the nut member.
Figure 8:
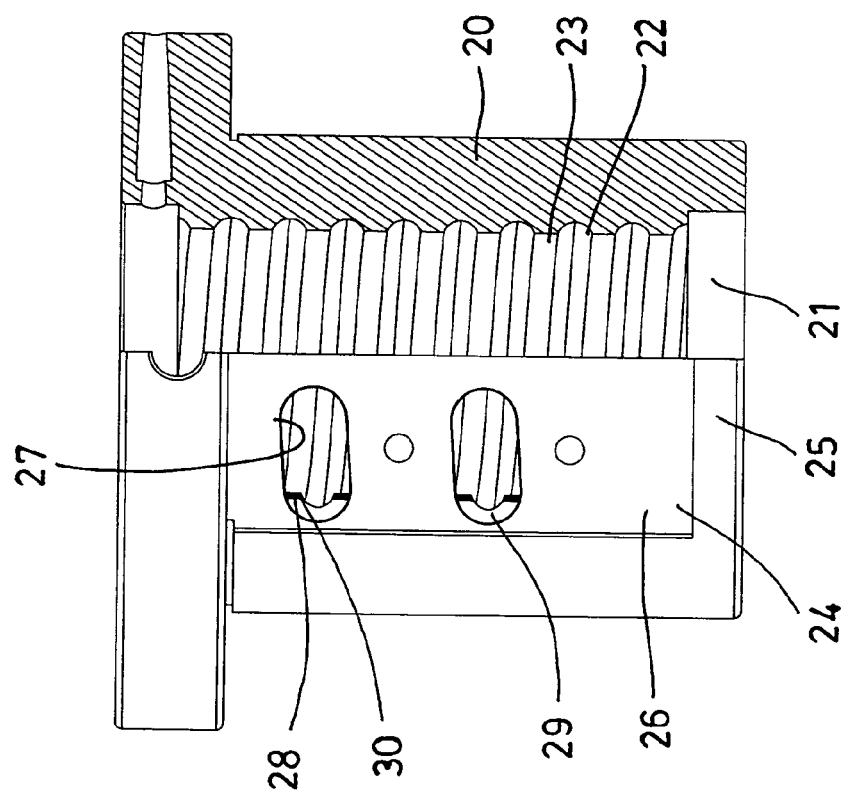
FIG. 8 is a plan schematic view of the nut member, in which a portion of the nut member has been cut off for showing the inner structure of the nut member.

As shown in FIGS. 2-8, the nut member 20 further includes one or more (such as three) pairs of apertures 28 also formed in the upper portion 25 of the nut member 20 and aligned or concentric with the orifices 27, and communicating with the orifices 27 of the nut member 20 respectively, and the orifices 27 include an inner diameter greater than that of the apertures 28 of the nut member 20 for forming a peripheral shoulder 29 between the orifices 27 and the apertures 28 of the nut member 20, and for forming a cut off portion or straight fence 30 in the apertures 28 or between the orifices 27 and the screw hole 21 of the nut member 20, best shown in FIGS. 6-8. The length (L) of the straight fence 30 in the nut member 20 (FIG. 5) may be different from each other or may be changed when the inner or the outer diameter of the nut member 20 is changed or different from each other, and it is preferable that the length (L) of the straight fence 30 in the nut member 20 is ranged between 0.5 and 30 mm.

One or more (such as three) ball return pipes 4 each include a substantially U-shaped structure or configuration having a central elongated tubular member 40, and having two ends 41, and having two curved intermediate or coupling portions 42 located or formed between the central tubular member 40 and the ends 41, and the ball return pipes 4 each include a ball return pathway 43 formed therein and formed or defined by an inner peripheral wall 44 and communicating with the helical grooves 22 and/or the endless ball guiding passages 8 of the nut member 20 of the ball screw device 1 for receiving the ball bearing members 80. A return pipe securing device or holder 50 may further be provided and attached onto the cut off portion 24 of the nut member 20 and engaged with the ball return pipes 4 for solidly securing the ball return pipes 4 to the nut member 20.

As also shown in FIGS. 2-5, the ends 41 of the ball return pipes 4 are engaged with the peripheral shoulders 29 of the nut member 20 for allowing the ball return pipes 4 to be solidly and stably anchored and secured to the nut member 20, and the ball return pipes 4 each include an inner diameter no less than that of the apertures 28 of the nut member 20 for guiding the ball bearing members 80 to smoothly move through the ball return pathways 43 of the ball return pipes 4 and the endless ball guiding passages 8 of the nut member 20, it is preferable that the inner peripheral walls 44 at the ends 41 of the ball return pipes 4 are aligned with or flush with the straight fence 30 of the nut member 20 for further smoothly guiding the ball bearing members 80 to move through the ball return pathways 43 of the ball return pipes 4 and the endless ball guiding passages 8 of the nut member 20.

The ball screw device 1 further includes a ball coupler device 6 for suitably and stably coupling the ball bearing members 80 together, and the ball coupler device 6 includes one or more (such as two) longitudinal connecting members 60, and a number of spacers 61 secured to or between the connecting members 60 and spaced from each other for forming a number of compartments 62 between the spacers 61 and for receiving the ball bearing members 80, and thus for suitably and stably coupling the ball bearing members 80 together. The inner diameter of the screw hole 21 of the nut member 20 is greater than the outer diameter of the screw 10 for forming a peripheral slot 88 between the screw 10 and the nut member 20 and for slidably and stably receiving and anchoring or retaining the connecting members 60 of the ball coupler device 6 and for guiding the connecting members 60 of the ball coupler device 6 to smoothly move through the peripheral slot 88 that is formed between the screw 10 and the nut member 20.

As also shown in FIG. 5, it is preferable that the straight fence 30 in the nut member 20 includes a width (W) equals to or greater than the distance (d) that the connecting member 60 is extended into the helical grooves 22 of the nut member 20 or extended relative to the helical teeth 23 of the nut member 20, or the distance (d) between the addendum of the helical teeth 23 of the nut member 20 and the outer edge of the connecting member 60 for allowing the ball bearing members 80 to be guided to smoothly move through the ball return pathways 43 of the ball return pipes 4 and the endless ball guiding passages 8 of the nut member 20. The straight fence 30 in the nut member 20 may be contacted or engaged with the connecting member 60, and the aperture 28 of the nut member 20 may suitably reduce the size or dimension of the peripheral shoulder 29 of the nut member 20 for guiding and preventing the connecting member 60 from being contacted and interfered with or rubbed by the peripheral shoulder 29 of the nut member 20 and for preventing the connecting member 60 from being cut or damaged by the peripheral shoulder 29 of the nut member 20 after use.

In operation, as shown in FIGS. 3-4, the provision and the formation of the straight fence 30 in the nut member 20 may be used to guide the ball bearing members 80 to smoothly move through the ball return pathways 43 of the ball return pipes 4 and the endless ball guiding passages 8 of the nut member 20, and may prevent the ball bearing members 80 from being interfered or obstructed by the nut member 20, and/or may prevent the helical teeth 23 of the nut member 20 in the orifices 27 and the apertures 28 of the nut member 20 from being scrubbed or broken or damaged by the ball bearing members 80 when the ball bearing members 80 are moved in a fast speed through the endless ball guiding passage 8 of the ball screw device 1.

Accordingly, the ball screw device in accordance with the present invention includes a securing or mounting structure for suitably and smoothly attaching or anchoring or securing or retaining a ball return pipe to the ball screw device and for suitably guiding the ball bearing members to smoothly move through the endless ball guiding passages of the ball screw device and the ball return pipe.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A ball screw device, comprising:
   a) an elongated screw including a helical groove formed therein;
   b) a nut member including a crew hole formed therein for receiving said screw, and including a helical groove for engaging with said helical groove of said screw, and for forming an endless ball guiding passage between said nut member and said screw, and including two orifices formed in said nut member and communicating with said helical groove of said nut member, said nut member including two apertures formed therein and aligned with said orifices and concentric with said orifices and communicating with said orifices of said nut member respectively, and said orifices including an inner diameter greater than that of said apertures of said nut member for forming a peripheral shoulder between said orifice and said aperture of said nut member;
   c) a plurality of ball bearing members engaged in said endless ball guiding passage of said ball screw device;
   d) a ball coupler device including a connecting member, and a plurality of spacers secured to said connecting member for forming a plurality of compartments between said spacers and for receiving said ball bearing members and for coupling said ball bearing members together; and
   e) a ball return pipe including a U-shaped structure having a central tubular member, and having two ends for engaging into said orifices of said nut member respectively and for engaging with said peripheral shoulder that is formed between said orifices and said aperture of said nut member, and having two curved coupling portions formed between said central tubular member and said ends, and said ball return pipe including a ball return pathway formed therein and communicating with said helical groove and said endless ball guiding passage of said nut member for receiving said ball bearing members;
   said nut member including a straight fence formed between said orifice and said screw hole of said nut member and formed in said aperture of said nut member for guiding said ball bearing members to move through said ball return pathway of said ball return pipe and said endless ball guiding passage of said nut member and for preventing said connecting member of said ball coupler device from being contacted by and interfering with said nut member, said straight fence of said nut member being on each side of said ball groove so as to form a pair of straight fences that have lengths, respectively, said pair of straight fences being parallel to each other along said lengths of said pair of straight fences, respectively, said straight fence of said nut member including a length (L) ranged between 0.5 and 30 mm.

2. The ball screw device as claimed in claim 1, wherein said ball return pipe includes an inner diameter no less than that of said aperture of said nut member.

3. The ball screw device as claimed in claim 1, wherein said ball return pipe includes an inner peripheral wall for forming said ball return pathway of said ball return pipe and flushing with said straight fence of said nut member.

4. The ball screw device as claimed in claim 1, wherein said nut member includes a cut off portion formed in an upper portion thereof and defined by an upper surface of said nut member.

5. The ball screw device as claimed in claim 1, wherein said nut member includes an inner diameter greater than an outer diameter of said screw for forming a peripheral slot between said screw and said nut member and for receiving and anchoring and retaining said connecting member of said ball coupler device.

6. The ball screw device as claimed in claim 1, wherein said straight fence of said nut member includes a width (W) equals to a distance (d) that the connecting member is extended relative to said screw hole of said nut member.

* * * * *